United States Patent [19]
King

[11] 3,844,058
[45] Oct. 29, 1974

[54] DOWN-RIGGER REEL

[76] Inventor: Jack C. King, 678 Massachusetts Ave., North Muskegon, Mich. 49445

[22] Filed: June 8, 1973

[21] Appl. No.: 368,347

[52] U.S. Cl. ............................ 43/27.4, 242/106
[51] Int. Cl. ............................................ A01k 89/00
[58] Field of Search .......... 43/27.4, 43.12; 242/106; 235/103

[56] References Cited
UNITED STATES PATENTS
| | | | |
|---|---|---|---|
| 2,792,658 | 5/1957 | Stafford | 43/27.4 X |
| 3,614,016 | 10/1971 | Rieth | 242/106 |
| 3,719,331 | 3/1973 | Harsch | 242/106 |

Primary Examiner—Antonio F. Guida
Assistant Examiner—Daniel J. Leach
Attorney, Agent, or Firm—Miller, Morriss, Pappas & McLeod

[57] ABSTRACT

A down-rigger reel having two handles, both operating the reel or drum element and the reel being journalled on rod frame supported on a base and extending upwardly and outwardly to support a rod extension intermediate the two frame rods. A swivel connection is provided at the end of the rod extension and supports a depending sheave over which a down-rigger line is trained. A flip-lock is provided on the frame which selectively locks against removal of down-rigger line and automatically unlocks when line is wound on the reel. The reel is provided with spokes and the lock thrusts against any selected spoke. A counter is provided which meters out the amount of line. The frame is socket mounted to a mounting plate or other support means for attachment or detachment on a fishing vessel. The frame is stabilized by a splice plate which secures the outboard ends of the rod stock frame elements and supports the extension arm.

The present invention is directed to a down-rigger reel and more specifically to a reel primarily usable in supporting a weight line which serves to carry the weight or sinker to a selected trolling fishing depth and to which the lure line is secured. A reel used for the purpose of down-rigger fishing should be simple, relatively trouble-free, and should provide a built-in resilience against shock-loading. This is true because the weight suspended from the line served by the reel sometimes fouls on sub-surface debris and at that moment it is desirable to have some resilience in the frame structure. It is also desirable to provide a reel that is easily manipulated against substantial loads and which is resistant to deterioration in a wet and sometimes saline atmosphere. On some occasions the reels of the present invention are actually employed for direct trolling and in such instances it may be desirable to replace the extension rod with a separate and distinct rod to provide better sensitivity. This is easily accomplished in the reel of the present invention. Additionally, it is desirable to build as economical and trouble-free a reel as possible since the reel is likely to be subjected to all forms of adverse weather conditions as by remaining for whole seasons in the open weather. As the description proceeds it will be appreciated that the present reel is simple, the underslung sheave which swivels at the rod end provides a substantially universal guide control for line moving from the rod tip to the reel or outwardly. This allows the fishing craft to be maneuvered easily without fouling the line in respect to the reel.

6 Claims, 2 Drawing Figures

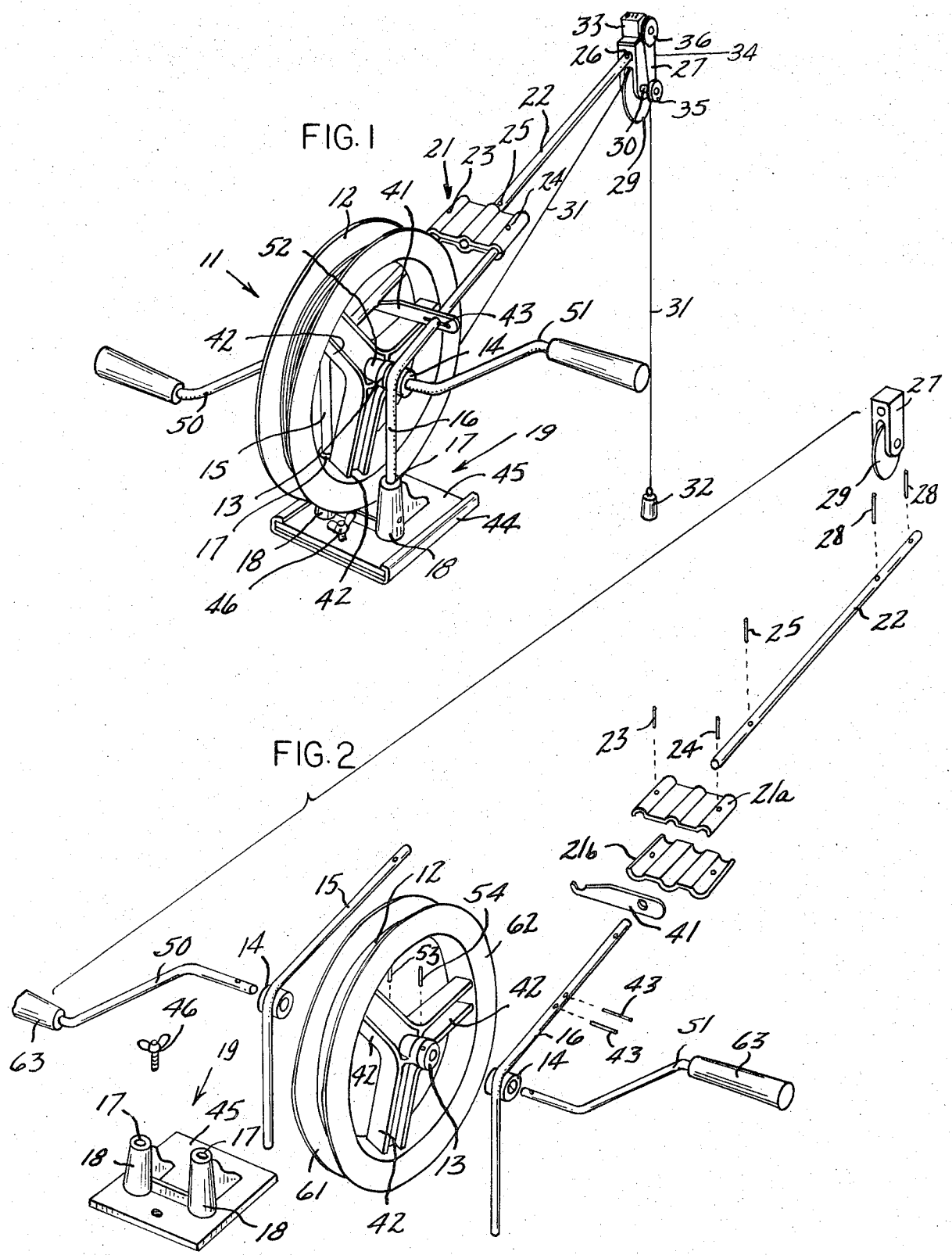

DOWN-RIGGER REEL

Accordingly, the primary object of the present invention is to provide a reel construction in which the frame is of rod stock and the frame supports simple journalling for support of the reel element therebetween.

Another object is to provide a two handled reel, where the handles project from both sides of the reel or drum at the axes thereof in the form of crank arms.

Still another object is to provide a rod frame construction in which the extension from the frame is securely clamped by a splice means between the frame rods to provide added strength and to support the spacing interval of the rod frame.

Still another object is to provide a construction utilizing a sheave at the rod tip which is underslung and swiveled on the end of the rod and which delivers line to the reel under variant directional conditions found in the maneuvering of the boat and the running of the fish or trailing of the sinkerweight.

It will also be appreciated as the description proceeds that the rod base is vastly simplified since the rod ends are simply plugged into sockets located at a desired interval on a base plate and the base plate is selectively inserted and removed in a channel mount element.

Other objects of the invention will become increasingly apparent to those skilled in the art as the description proceeds and including economy, easy serviceability and a rugged dependability under fishing environment.

THE PRIOR ART

The earliest down-rigger reels were mere receptacle drums journalled between stanchions on some form of frame and the line extended from the drum, over a sheave or line guide secured to the end of the frame and thence through a grommet or guide to the depending weight. Subsequently, there appeared on the Great Lakes reels in which the frame was formed from resilient material such as a strip of steel and a sheave was mounted on the outer end thereof. The steel arm extended out over the edge of the boat. A similar type of device subsequently appeared in the U.S. Pat. No. 3,614,016. All of such devices included lock means for securing the drum in fixed set relation and the U.S. Pat. Nos. 488,678, 374,737, 2,786,296, 2,792,658 and 3,417,502 generally characterize the background art. None propose or show a reel frame from rod stock and none show the socketing of an extension element between the rods forming the frame. None of the art shows the location of a guide sheave in swivel relation on the end of an extension and depending beneath the extension or arm and there is no indication of double handled reel structures which is particularly important in getting manual power where needed in down-rigger reels. Additionally, the use of resin reels, sheaves, and other structural components in relation to the rod stock frame appears unique and the fastening using roll pins in jig drilled parts results in substantial fabricating economy.

GENERAL DESCRIPTION

In general, the down-rigger reel of the present invention includes a two-handled drum journalled in a pair of aligned bearings each supported by a bar or rod frame in spaced parallel relation to each other and the feet thereof being socketed in a base platform element and the outer ends thereof secured in spaced apart relation to each other in a spacer element which also supports an extension arm intermediate the outboard ends of the rod frame elements. On the end of the rod extension a sheave element is provided which depends from the end of the extension and underneath the extension in pivotal relation around the rod extension. The sheave depends in substantial plane relation to the reel or drum but is displaceable therefrom in accordance with the movement of line running over the sheave from the reel and down to support a weight or sinker as used in down-rigger fishing.

The crank handles are extended from each side of the shaft of the drum and the cable or line stored on the drum passes from under the drum and under the rod extension and over the sheave. A counter may be used in connection with the sheave to provide an indicator of the amount of line or cable released or the amount yet to be returned to the drum. When the rod construction is used a very convenient and economical assembly fastener is the roll pin since the rod stock and machined or cast elements can be jig drilled, fitted in place and the pins driven into the drilled openings. Similarly the structure may be disassembled or repaired easily. The rod extension is preferably springy or resilient and variant materials, metal, resin, fiberglass, or the like can be used in various sizes or tapers to provide a more sensitive extension tip. A simple lock plate is secured rotationally to one of the frame elements and when flipped across to contact with the other frame element is an effective brake or bar preventing any additional cable or line from being played out off of the drum. On rewind, the lock automatically falls away from the blocking relation through the drum. The drum or reel is relatively narrow and preferably formed of a durable weather resistant and dimensionally stable injection molded resin with three or more substantial spoke elements extending from the hub which is fixed to a suitable upset shaft. The shaft rotates with the drum or reel and is supported by the bearing carried by the frame rods and is affixed to the handles for selected rotation. Actually the handles or cranks are supported in the journals and are in turn socketed in the hollow cast-in situ shaft and are pinned thereto.

IN THE DRAWINGS

FIG. 1 is a perspective view of a down-rigger reel in accordance with the present invention and indicating the underslung swivel tip, the socketed rod frame construction, flip lock, and the double handles.

FIG. 2 is a perspective parallel exploded view of the reel shown in FIG. 1 and indicating the simplicity of construction consequent to the rod frame.

SPECIFIC DESCRIPTION

Referring to the drawing and with particularity to the FIG. 1 thereof, the down-rigger reel 11 comprises a spoked drum 12 on shaft 13 and the drum 12 is supported on bearings or journals 14 which are welded, brazed or otherwise secured to the rod stock frame elements 15 and 16, which frame elements 15 and 16 are in spaced apart parallel position secured at the lower terminal ends in sockets 17 in the pedestals 18 of the base element 19. The bearings 14 are secured to the rod stock of the frames 15 and 16 at the bend forming the rod frames 15 and 16 into substantially L-shaped structures. This provides excellent support for the bearings 14. The base plate element 19 is cast or otherwise formed and the sockets 17 are jig drilled for a slip fit upon insertion of the rod frame elements 15 and 16 in the sockets 17. The frame elements 15 and 16 are pinned in place on assembly by the roll pins 23, 24. Other means may be used for fastening but excellent economy is realized by this construction and knockdown and repair of the structure is thus easily accomplished. The outboard ends of the rod stock frame elements 15 and 16 are held in spaced apart socketed relation by the splice element 21 which clamps onto the two rod frames 15 and 16 and simultaneously and intermediately supports the rod extension 22 in parallel forward extension therefrom. Fastening is accomplished by the use of roll pins 23, 24 and 25 in prevention of chance loosening in usage. As will be seen, the splice element 21 is preferably formed in two identical opposed parts and is then held together by rivets as shown or by upsetting the ends of the roll pins 23 and 24. The splice element 21 is preferably formed from rigid, tough and dimensionally stable resin cast or die cast such as Nylon, Delrin, or the like, the latter material being a product identified under the trademark of E. I. duPont de Nemours and Company. This construction provides for suitable toughness, excellent tolerance and dimensional control, without machining, and provides some modicum of flexure at the splice 21 without interfering with the performance. At the end 26 of the rod extension 21, a sheave block 27 is rotationally supported and pinned in place by fasteners such as roll pins 28. This block 27 supports the sheave 29 in underslung relation beneath the extension 22 on the shaft 30. The sheave 29 is narrow and relatively deep grooved so that the cable, wire, or line 31 is securely retained in the groove against displacement when the line 31 is under tension as in support of the weight or sinker 32 and any associated rigging. A revolution counter 33 may be mounted on the block 27 and placed in calibrated drive relation to the sheave 29 by a simple tensioned belt 34 passing over the pulleys 35 and 36. The pulley 35 turns with each revolution of the sheave 29 and transmits the motion to the pulley 36 which activates the counter 33. By calibrating in lineal measure and since the counter is reversible, the counter reflects the amount of line depending from the sheave 29 where the counter starts at zero. The counter 33 is optional but is conveniently located on the block 27 where in the line 31 is carried at all times beneath the rod extension 22 and the tip 26. This arrangement allows relatively tight maneuvering with the fishing boat since the sheave can swivel easily and the line 31 can range left or right and in various angular relationships from the sheave 29. In the reel structure 11 it will be noted that the line 31 passes off of the drum 12 from beneath the drum 12 so that as viewed in the FIG. 1, the drum rotates counterclockwise as the line 31 is withdrawn therefrom. This allows the lock 41 to be flipped between the spokes 42 to impingement on the rod frame element 15. The lock 41 is made from flat metal stock and is rotational on the frame rod 16 and pinned in place on the rod 16 as by the fasteners 43 such as roll pins. A mounting channel 44 having an inturned flange on the legs is provided which is screwed in place to the deck transom or rail of a fishing boat. A stop (not shown) such as a headed screw prevents the base platform 45 from passing all the way through. Then, the thumb screw 46 can be turned down in the threaded opening through the base platform 45 to engage the channel 44, thus locking the platform 45 and its integral pedestals 17 and 18 in place until removal is desired. Then, by loosening the set screw 46 the platform 45 and base elemment 19 is easily removed.

The two handles or cranks 50 and 51 are passed through the bearings 14 and are connected drivably to the drum shaft 13 as by insertion in the shaft 13 extending from the hub 52 and are pinned in place as by the roll pins 53 and 54.

In FIG. 2 the simplicity of construction and assembly is demonstrated. The drum 12 is appreciated as easily molded or die cast from light metal or resin and the resin is preferred. The flanges 61 and 62 integral with the drum 12 are deep and the drum 12 is relatively narrow so that line 31 wound on the reel is not easily displaced. The spoke elements 42 are integral and support the perimeter spool or drum portion 12. Handle grips 63 are on the ends of the handles 50 and 51 and reducing the manual attrition in manipulation and preventing a metal to shim contact in freezing weather. In FIG. 2 the preferred embodiment of the splice element 21 is seen in the sandwich plates 21a and 21b which are in opposed identical relation to form socketing for the upper ends of the bar frame elements 15 and 16 and the lower end of the intermediate extension rod element 22. The sheave 29 is underslung and the counter 33 is eliminated and can be added to the top of the block 27 as desired. The simplicity of the flip lock element 41 is best appreciated as in the form of a bar with a transverse opening therethrough, which when retained in position on the rod 16 by the pin 43 can span the gap of the drum 12 and is retained by the spoke 42 against the rod frame 15 by the weight of the sinker or lure 32 seen in FIG. 1 at the lower terminal end of the line 31.

In operation, the reel of the present invention has proved most useful in service, the resilience of the flexible frame provides an excellent impact absorbing structure and the rod extension is easily substituted to give the desired springiness of action. The underslung rigging resulting from depending the sheave and rotatably mounting the sheave block results in improved trolling performance and allows the trolling vessel greater flexibility of movement without causing disengagement of the line. The two handed winding means puts utility where needed in the structure. The base plate mounting facilitates removal and installation of the reel from the fishing vessel. Above all, the rod form of the frame substantially extends the utility of such reel structures and allows the inclusion of the many advanced features without substantial increase in cost.

Having thus described my invention, several modifications thereof, and the operation others skilled in the art will readily appreciate, other modifications, improvements and changes within the art and such modifications, improvements and changes are intended to be included herein limited only by the scope of my hereinafter appended claims.

I claim:
1. A down-rigger reel comprising:
   a frame formed from a pair of rod stock members;
   bearings secured to each of said rod stock members;
   a pedestal plate having sockets receiving one end of said pair of rod stock frame members;

a line receiving drum between said pair of rod stock members and said drum supported rotationally in said bearings;

a crank handle operably connected to said drum for selected winding or unwinding rotation thereof;

a splice element socketing the outboard ends of said rod stock frame elements and having a parallel socket intermediate said socketing for said outboard ends, said splice element aligning said bearings and said rod stock members;

an extension rod in the intermediate of said splice element sockets; and sheave means at the unsocketed end of said extension rod.

2. In the combination of claim 1 wherein said crank handle is double extending on both sides of said drum.

3. In the combination of claim 1 wherein said sheave is rotatably attached to the extended end of said extension rod and depends therefrom.

4. A two handled reel for down-rigger fishing and the like comprising:

a base plate having a pair of sockets therein in spaced apart relation;

a pair of substantially L-shaped rod stock frame elements in parallel spaced apart planes, the lowermost ends socketed and secured in said sockets of said base plate;

bearing secured to said frame elements;

a spoked line drum between said frame element and rotatably supported by said bearings;

crank handles connected to said drum on both sides thereof and rotatable therewith;

a splice plate defining three spaced apart parallel sockets and the two outermost parallel sockets over and connected to the outboard ends of said pair of frame elements;

an intermediate rod in the intermediate of said sockets in said splice plate and said rod extending outwardly therefrom;

a sheave block including a sheave rotatably secured to the end of said extension rod and said sheave depending beneath said tip of said rod;

a line on said drum and passing underneath said drum and over said sheave and downwardly; and a bar lock element rotational on one of said rod frame elements and selectively between said spokes to blocking engagement against the other of said rod frame elements.

5. In the combination of claim 4 wherein said base plate is selectively and locatably inserted in a channel shaped member having an inturned upper flange and including means to secure said mounting to a boat or other vessel.

6. In the combination of claim 4 wherein a rotation counter is drivably connected to said sheave and mounted on said sheave block.

* * * * *